June 6, 1944.  M. KATZ  2,350,622
SCALE OR BALANCE
Filed Jan. 2, 1942  2 Sheets-Sheet 2
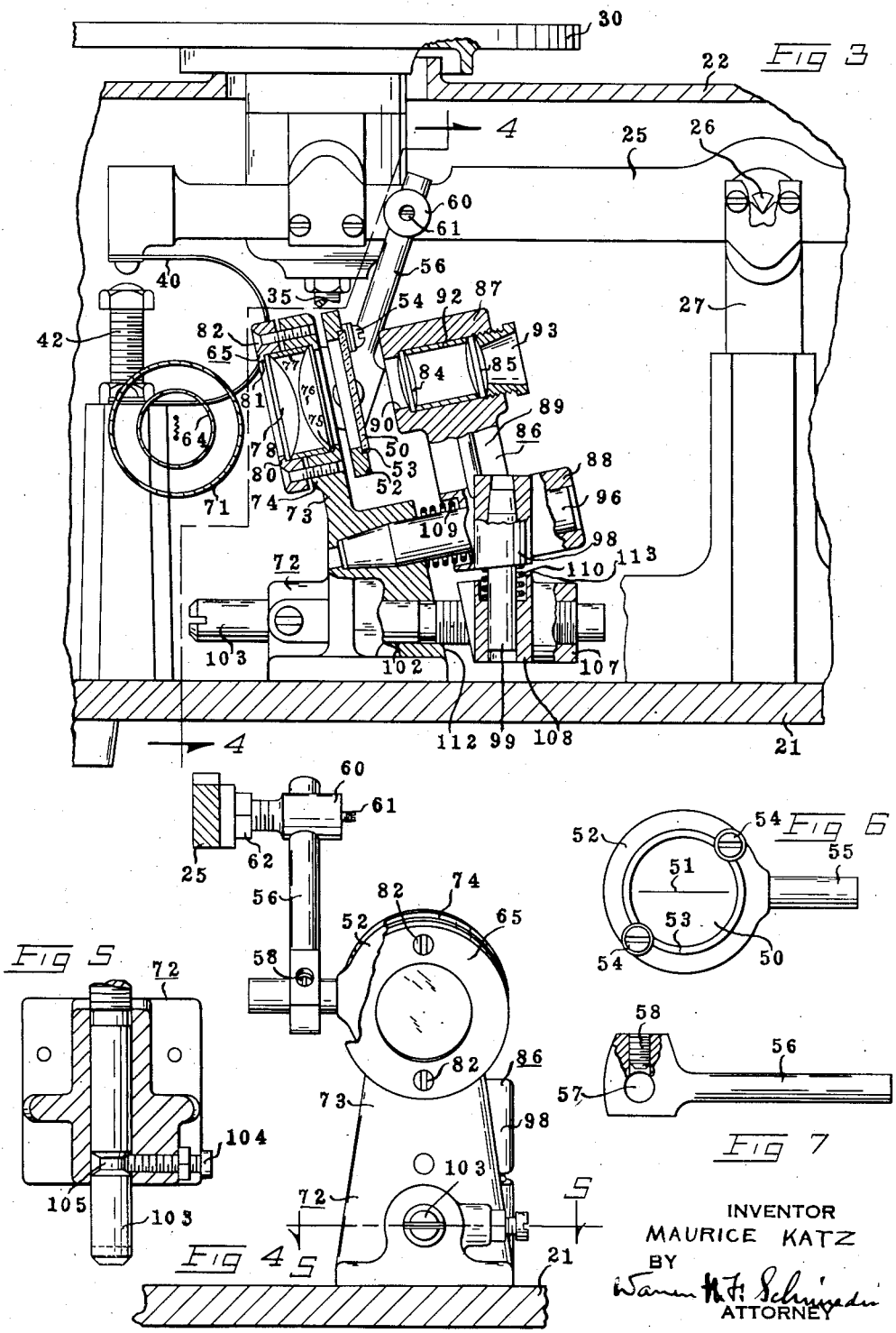
INVENTOR
MAURICE KATZ
BY
ATTORNEY Patented June 6, 1944

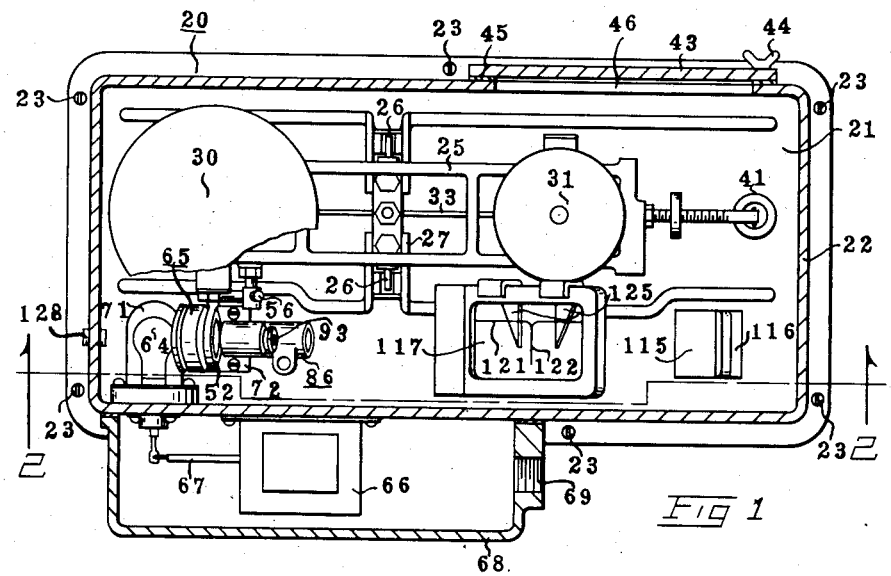

2,350,622

UNITED STATES PATENT OFFICE 2,350,622

SCALE OR BALANCE

Maurice Katz, Brooklyn, N. Y., assignor to The Exact Weight Scale Company, Columbus, Ohio, a corporation of Ohio Application January 2, 1942, Serial No. 425,398

6 Claims. (Cl. 88—24)

The present invention relates to weighing scales, and more particularly to mechanism for indicating the deflection of the beam of a weighing scale, which mechanism includes an index member movable by the scale beam and in optical alignment with a magnifying lens, and a light source for projecting an image of the index member through the lens, the lens being arranged to project the image at an acute angle with horizontal and onto a screen having indicia.

An object of the invention is to mount the lens on a unit that is movable along a guide extending parallel with the axis of the lens and provide a second unit movable in a horizontal direction, for example, by a driving member, the two units being connected by a member secured to one of the units and slidably engaging with the other so that the units can move along converging paths.

Another object of the invention is to provide a method of forming a device including a plurality of individual units each having openings, which openings are axially aligned with one another, the units being first formed in an integral member, as by casting, then drilling an opening in the member, and then severing the member on a plane intersecting the drilled opening.

Other objects and advantages of the present invention will be apparent from the following description, reference being had to the accompanying drawings wherein a preferred form of embodiment of the invention is clearly shown.

In the drawings:

Fig. 1 is a plan view, in section, of a weighing scale, the section being taken substantially on line 1—1 of Fig. 2;

Fig. 2 is a view, in section, of the scale shown in Fig. 1, the section being taken substantially on line 2—2 of Fig. 1;

Fig. 3 is a fragmentary view, partly in section and on a larger scale, of the weighing scale showing the mechanism for projecting an image of an index member carried by the scale beam;

Fig. 4 is a view of the mechanism shown in Fig. 3, the view being taken substantially on line 4—4 of Fig. 3, part of the mechanism being shown broken away;

Fig. 5 is a view, in section, taken on line 5—5 of Fig. 4;

Fig. 6 is a view, in elevation, of an index member; and

Fig. 7 is a view, in elevation, of a link for connecting the index member with the scale beam, part of the link being shown in section.

Although my invention is applicable to weighing scales of various types, for the purpose of disclosing a preferred form of embodiment of the invention, I have shown, referring to the accompanying drawings, an "over and under" type weighing scale 20. The weighing scale 20 comprises a base 21 for supporting the scale mechanism and this mechanism is enclosed by a casing 22 that is secured to the base 21 by screws 23. Preferably, a gasket 24 is interposed between the casing and the base for forming a dust proof seal. The scale mechanism is similar to that shown in Fig. 2 of the patent to J. F. Sullivan No. 2,218,562, and it comprises, generally, a scale beam 25 fulcrumed at 26 on two uprights 27, which uprights are mounted on the base 21. The fulcrum 26 is formed by suitable knife edge bearings.

The forward end of the scale beam 25 carries a load platter 30, which platter is pivotally supported on the beam by the usual pivotal supports. A weight platter 31 is supported adjacent the opposite end of the scale beam also by the usual pivotal support. The platters 30 and 31 are maintained level during oscillation of the beam 25 by the well known expedient of a check rod 33, which rod is pivotally supported at 34 on a stem 39 depending from the uprights 27 and having one end thereof pivotally connected to a stem 35 extending downwardly from the platter 30 and the opposite end pivotally connected to a stem 36 extending downwardly from the weight platter 31. Resilient metallic strips 40 are provided at each end of the scale beam 25, and a dash pot 41 is attached to the rearwardly extending end of the beam. The strips and dash pot function in the usual manner. Suitable stops 42 are also provided at each end of the scale beam for limiting the deflection of the latter. The load platter 30 extends upwardly through an opening in the forward portion of the casing 22 and the weight platter 31 is enclosed by the casing 22, the rearward portion of which casing has considerably greater depth than the forward portion. Weights are placed on the platter 31 through an opening 46 formed in one side of the rearward portion of the casing 22. The opening 46 is closed by a plate 43 that is secured to the casing by thumb screws 44. Preferably, a gasket 45 is interposed between the plate 43 and the casing 22 for forming a dust tight seal.

The weighing scale 20, being the "over and under" type, is arranged to indicate whether or not the load on the platter 30 is greater or less than the weight placed on the platter 31. If the load and weight are the same, the beam 25 will be substantially horizontal, but if there is a difference in weight of the load and the weight on the respective platters, the beam will be deflected. The mechanism for indicating the deflection of the scale beam 25 comprises, in general, a linear index member carried by the scale beam, a magnifying lens arranged in optical alignment with the index member and a suitable light source arranged to project a shadow or image of the index member through the lens and onto a screen visible to the scale operator. The screen is provided with indicia which, in conjunction with the image of the index member, indicates the deflection of the scale beam. By moving the index member transversely of the axis of the magnifying lens and projecting the image of the index member through the lens by the light, a very slight movement of the scale beam will be clearly indicated.

The index member should be formed by a suitable device that would cause a linear shadow to be projected, such as fine wire or pointer, but in the present embodiment it comprises a glass disc 50 having a linear scratch 51 formed on one of the surfaces thereof. The scratch 51 forms a linear shadow when light is projected through the disc. It is to be understood that the term "index member" includes the scratch 51 on the disc 50. The disc 50 is mounted on a ring like frame 52. The frame 52 is formed having an annular shoulder 53 against which the disc 50 abuts. The disc is maintained against the shoulder 53 by two screws threaded in the frame, the screws being shown at 54. Preferably, a rubber washer is interposed between the heads of the screws 54 and the glass disc. The frame 52 is also formed having a stem 55, which stem is circular in cross section. The stem 55 is adapted to be attached to one end of a link 56 by extending the stem into an opening 57 drilled through an enlarged end of the link and transversely thereof. The stem 55 is secured in the opening 57 by a set screw 58. It is apparent that the frame 52 extends laterally from the link 56 and that the angle formed between the axis of the ring like frame and the link can be varied by turning the stem 55 in the opening 57.

The link 56 is attached to the scale beam 25 by extending one end thereof through an opening formed through a stud 60, which stud is attached to the side of the scale beam, and securing the link 56 in the stud by a set screw 61. The stud 60 is attached to the scale beam 25 by threading one end thereof into the scale beam. The stud is locked in position by a lock nut 62. It is apparent that the angle at which the link member 56 forms with the scale beam can be adjusted by loosening the lock nut 62 and rotating the stud 60 for causing the link to extend at the desired angle and then resetting the lock nut. In the present embodiment of the invention, the link member 56 extends downwardly from the scale beam and the axis of the frame 52 extends in the direction of the fulcrum 26 for the scale beam and is spaced from the beam.

The light source for the indicating mechanism comprises a low voltage electric lamp 64 and a light condensing device 65. The lamp 64 is mounted on a side wall of the casing 22 and extends laterally into the casing. It is disposed at one side of and below the scale beam 25. The electric lamp 64 is, preferably, a six volt lamp and current therefor is provided by a transformer 66 through suitable connections 67. The transformer 66 is mounted on the exterior of the casing 22 and is enclosed by a housing 68 that is attached to the side wall of the casing. The housing 68 is provided with an opening 69 for receiving high voltage wires, not shown, by which the transformer is energized. A glass hood 71 is secured over the lamp 64 for forming a dust proof seal between the lamp and the interior of the casing 22. This seal is required where the scale is used for weighing highly inflammable substances or explosives, such as gun powder.

The light condensing device 65 includes a base member 72, which member is mounted on the base 21 by suitable screws. The base member 72 includes an upwardly and forwardly extending section 73, the upper portion of which section is in the form of a ring like frame 74. The frame 74 has an annular shoulder 75 extending inwardly about the opening therethrough. A condensing lens 76 is mounted in the frame 74 by pressing it against the shoulder 75 by a tubular member 77, which member 77 is telescoped in the opening through the frame 74 and edges of one end thereof engage the lens. The edges of the opposite end of the tubular member 77 form a shoulder against which a second condensing lens 78 is pressed by an annular rim 80. The rim 80 has an annular inwardly extending shoulder 81 that engages the lens 78 adjacent the edges thereof. The rim 80 is attached to the frame 74 by screws 82.

The magnifying lens through which the image of the scratch 51 is projected, comprises two magnifying lenses 84 and 85, which lenses are mounted in a movable unit 86. The unit 86 comprises two tubular sections 87 and 88 interconnected by a yoke 89. The tubular section 87 has an annular inwardly extending shoulder 90 formed at one end thereof, which shoulder serves to retain the lens 84 in the opening through the section. A tubular member 92 is fitted in the opening through the tubular section 87, and one end thereof engages the lens 84 for locking the lens in position. The opposite end of the tubular member 92 forms a shoulder for retaining the lens 85. The lens 85 is pressed against the end of the tube 92 by the end edges of a sleeve 93 that is threaded into the tubular section 87.

The tubular section 88 is slidingly mounted on a guide rod 96, which rod is rigidly secured to the base member 72 and extends from the base member in a direction parallel with the common axis of the condensing lenses 76 and 78 and so that the magnifying lenses are in alignment with the condensing lenses. Although the rod 96 can be attached to the base member by any suitable expedient, I have shown the rod secured in a tapered opening in the base member by a driven fit, the end of the rod in the opening and the opening being tapered.

The unit 86 also includes a vertically extending tubular section 98 formed at one side of the tubular section 88, and a downwardly extending rod 99 is rigidly attached in the tubular section 98 by a driven fit, similarly to the manner in which the rod 96 is attached in the base 72.

The base member 72 is provided with a horizontally extending opening 102, and a shaft 103 is extended through the opening. The shaft 103 is adapted to be rotated in the opening 102, and the forward end of the shaft is slotted for receiving a screw driver. Lengthwise movement of the shaft is prevented by a screw 104 that is threaded in the base member 72 and is adapted to extend between the side walls of a groove 105 formed about the shaft 103. The end of the screw 104 cooperates with the walls of the groove 105 for preventing endwise movement of the shaft. The rearwardly extending end of the shaft 103 is threaded, and a tubular unit 107 is threaded on the shaft. The unit 107 is provided with a vertically extending tubular section 108, which section is adapted to slidingly receive the rod 99.

When the shaft 103 is rotated, the unit 107 is prevented from rotating by the rod 99 cooperating with the walls of the tubular section 108, and therefore, the unit 107 will be moved in a direction of the axis of the shaft 103 by the threads on the rod. This movement of the unit 107 is transmitted to the unit 86 by the rod 99 and the unit 86 will be moved along the guide rod 96 in a direction at an angle to the direction of the unit 107. The diverging and converging of the paths of the units 86 and 107 is possible due to sliding of the rod 99 in the tubular section 108. Thus, by rotating the horizontally extending shaft 103, the lens carrying unit 86 is moved in the direction of the axis of the lens for focusing the image of the scratch 51 of the disc 50 on a reflector, which reflector is described hereinafter.

For counteracting any tendency of the unit 86 to wabble on the rod 96, I have provided a coil spring 109 about the rod 96 and intermediate the base 72 and the unit 86, and a coil spring 110 between the units 107 and 86 and surrounding the rod 99. The spring 109 urges the unit 86 outwardly along the rod 96, thereby causing the rod 99 to frictionally engage the walls of the opening in the tubular section 108. The spring 110 tends to rotate the units 86 and 107 in opposite directions, thereby causing the rod 99 to cooperate with the walls of the opening through the section 108 for establishing the vertical position of the unit 86 on the rod 96. Thus, although there may be relatively considerable differences in the diameters of the rod 96 and the opening in the unit 86 through which the rod extends and the diameter of the rod 99 and the opening through the section 108, the unit 86 will be restrained from wabbling on its guide.

I form the base member 72 and the units 86 and 107 by making a unitary die casting in which these members are formed integrally. The die casting is then placed in a drill jig. The opening through the section 88 and the opening in the base 72 for receiving the guide rod 96 are formed by drilling the casting so that the opening in the tubular section and the opening for the guide rod are formed by one drilling operation. Also, the casting is drilled, in one operation, to form the opening 102 and the opening through the section 107. These two drilling operations can be executed simultaneously if desired. I prefer to drill the casting for forming the openings through the sections 98 and 108 by a single drilling operation. After these drilling operations have been performed, the casting is severed on a plane indicated at 112. Then the part of the casting including the units 88 and 107 is severed along a plane indicated at 113. By first drilling all of the openings in the integral casting without removing the same from the jigs, perfect alignment of the respective openings will be had although the casting is severed into separate units.

The frame 52, carrying the glass disc 50, is arranged to be moved by the scale beam intermediate the light condensing device 65 and the tubular section 87 which carries the lenses 84 and 85. The shadow caused by the scratch 51 interrupting the beam of light from the light condensing device 65 is projected through the magnifying lenses 84 and 85 and upwardly in the direction of the axis of the fulcrum 26 and through the horizontal plane of the fulcrum and onto a reflector 115 located above the horizontal plane of the scale beam 25. By causing the image of the scratch 51 to be projected upwardly and in the direction of the axis of the fulcrum 26 for the scale beam 25, the disc 50 will be moved in an arc substantially at right angles to the axis of the magnifying lens and, therefore, the changes in distance between the scratch and lens during oscillation of the scale beam will be substantially at a minimum. This minimizes distortion of the image of the scratch by retaining the scratch substantially in focus during movement of the scale beam from one limit to the other.

The reflector 115 is supported by a bracket 116 that is mounted on the base 21. The image of the index member is reflected by the reflector 115 onto a translucent screen 117, which screen is, in this instance, a plate of etched glass. The screen 117 is suitably mounted in a frame 118, which frame is supported by a bracket 120 attached to the base 21. The frame 118 is rectangular and is provided with a rectangular opening through which the screen 117 may be viewed. The screen 117 is provided with indicia thereon comprising a line 121 extending lengthwise thereof, which will appear to extend vertical to the scale operator and having a line 122 extending at right angles to the line 121 at approximately the center of the screen. The screen 117 is in alignment with a window 124 formed in a rearwardly and upwardly extending wall of the casing 22 so that the operator of the scale can see the screen 117.

When the lamp 64 is lit, the image of the scratch 51 will be projected onto the reflector 115 and from there to the screen 117. The disc 50 carrying the scratch 51 is mounted in the frame 52 so that the image of the scratch will be parallel with the line 122. When the load on the platter 30 is exactly the same as the weight on the platter 31, the image of the scratch 51 will coincide with the line 122. If the weight of the load on the platter 30 is greater or less than the weight on the platter 31, the image of the scratch 51 will be on one side or the other of the line 122 for indicating that the load is either over or under the standard weight. If desired, the word "over" can be applied to the screen above the line 122 and the word "under" beneath the line for indicating whether or not the load is "over" or "under" weight.

Two pointers 125 are frictionally secured to the frame 118 by suitable clips, and these pointers extend transversely of the line 121. The purpose of these pointers is to indicate allowable tolerances in the deviation of the load on the platter 30 from the precise weight desired.

It is often desirable to adjust the focus of the image of the index member on the screen 117 after the casing 22 is secured to the base 21, and this is accomplished by rotating the shaft 103 by a tool such as a screw driver. Access is had to the shaft 103 through an opening 127 formed in an end wall of the casing 22 and in alignment with the end of the shaft, which opening is normally closed by a plug 128 threaded therein. The shaft 103 may easily be rotated by a screw driver, for example, since the shaft is horizontally disposed.

By my invention the mechanism for projecting the image of the index member can be adjusted by causing one unit to move in a horizontal direction and transmit motion to another unit carrying the lens, the latter unit being movable in a direction at an angle with the horizontal and in alignment with the focal axis of condenser 65.

While the form of embodiment of the present invention as herein disclosed constitutes a preferred form, it is to be understood that other forms might be adopted, all coming within the scope of the claims which follow.

I claim:

1. A weighing scale comprising in combination, a base extending in a horizontal plane; a beam support mounted on the base; a scale beam fulcrumed on the support and extending horizontally; mechanism for indicating movement of the scale beam including a lens member, an index member in alignment with the lens member, one of said members being movable relative to the other by the beam, and a light source aligned with said members for projecting an image of the index member through the lens, said members and light source being arranged to project the image of said index member upwardly and on an acute angle relative to the plane of the base; and means for moving one of said members in the direction of projection of the image including a movable unit, a guide for directing the movable unit in said direction, a shaft, a bearing for mounting the shaft for rotation about its longitudinal axis, said shaft extending parallel with the plane of the base, a unit threaded on the shaft, and a member extending from one of said units to the other of said units and slidingly engaging one of said units for transmitting movement of the second mentioned unit along said shaft to the first mentioned unit for causing movement of the first mentioned unit along said guide.

2. In a weighing scale of the type having a beam and a commodity receiver carried adjacent one end thereof; means for indicating movement of said beam in response to the placement of articles on said receiver comprising a screen, a light source for illuminating said screen, image producing means carried by said beam for movement between said light source and said screen, condensing lens means disposed between said light source and said image producing means, magnifying lens means, and means for adjustably supporting said magnifying lens means between said image producing means and said screen, said supporting means having a base member, guide means extending from said base member in parallel relation to the principal axis of said magnifying lens means, a holder for said magnifying lens means disposed for movement on said guide means, an actuator journalled for rotation in a horizontal plane in said base member, a transfer unit disposed for longitudinal movement on said actuator, and guide means extending substantially vertically between said holder and said transfer unit, said second mentioned guide means serving to transmit motion from said transfer unit to said holder when said actuator is rotated.

3. In a scale of the type having a movable element, a screen, means actuated by said movable element for producing a movable image, and means for projecting the movable image on the screen; means for adjusting an element of said image producing and projecting means comprising a base member, actuating means carried by said base member for movement in a predetermined plane, guide means projecting from said base member in a plane disposed at an angle to the plane of movement of said actuating means, holder means for the element to be adjusted, said holder means being disposed for movement on said guide means, and means for transmitting motion from said actuating means to said holder.

4. In a scale of the type having a movable element, a screen, means actuated by said movable element for producing a movable image, and means for projecting the movable image on the screen; means for adjusting an element of said image producing and projecting means comprising a base member, actuating means carried by said base member for movement in a plane disposed at an angle to the line of projection of said image, guide means extending from said base member in a plane parallel to the line of projection of said image, holder means disposed for movement on said guide means, said holder means receiving the element to be adjusted, a motion translating member disposed for movement by said actuating means, and motion transmitting means between said translating member and said holding means, movement of said actuator being transferred to said holder by said translating and transmitting means.

5. In a scale of the type having a beam, a screen, means moved by said beam for producing a movable image, and lens means for projecting the movable image on the screen; means for adjusting said lens means comprising a base member, an actuating screw journalled in said base member for rotation in a horizontal plane, a guide projecting from said base member in parallel relation to the principal axis of said lens means, holder means for said lens means disposed for movement on said guide means, and means for transmitting motion from said actuator screw to said holder.

6. In a scale of the type having a beam, a screen, means moved by said beam for producing a movable image, and lens means for projecting the movable image on said screen, the principal axis for said lens means being disposed at an angle to the horizontal; means for adjustably supporting said lens means comprising a base member, an actuator screw journalled for rotation in a horizontal plane in said base member, a transfer unit threadedly mounted on said actuator screw, a guide member projecting from said base member in parallel relation to the principal axis of said lens means, a holder for said lens means disposed for movement on said guide member, a second guide member disposed at right angles to said actuator screw, said second guide member extending between said holder and said transfer unit and being movable in one thereof, and spring means disposed between said base member and said holder and the latter and said transfer unit, rotation of said actuator screw serving to impart movement to said holder.

MAURICE KATZ.